X 0007452
Sheet 1-2 Sheets.
T. Colloghey.
Clover Huller.
Patented Feb. 28, 1833.
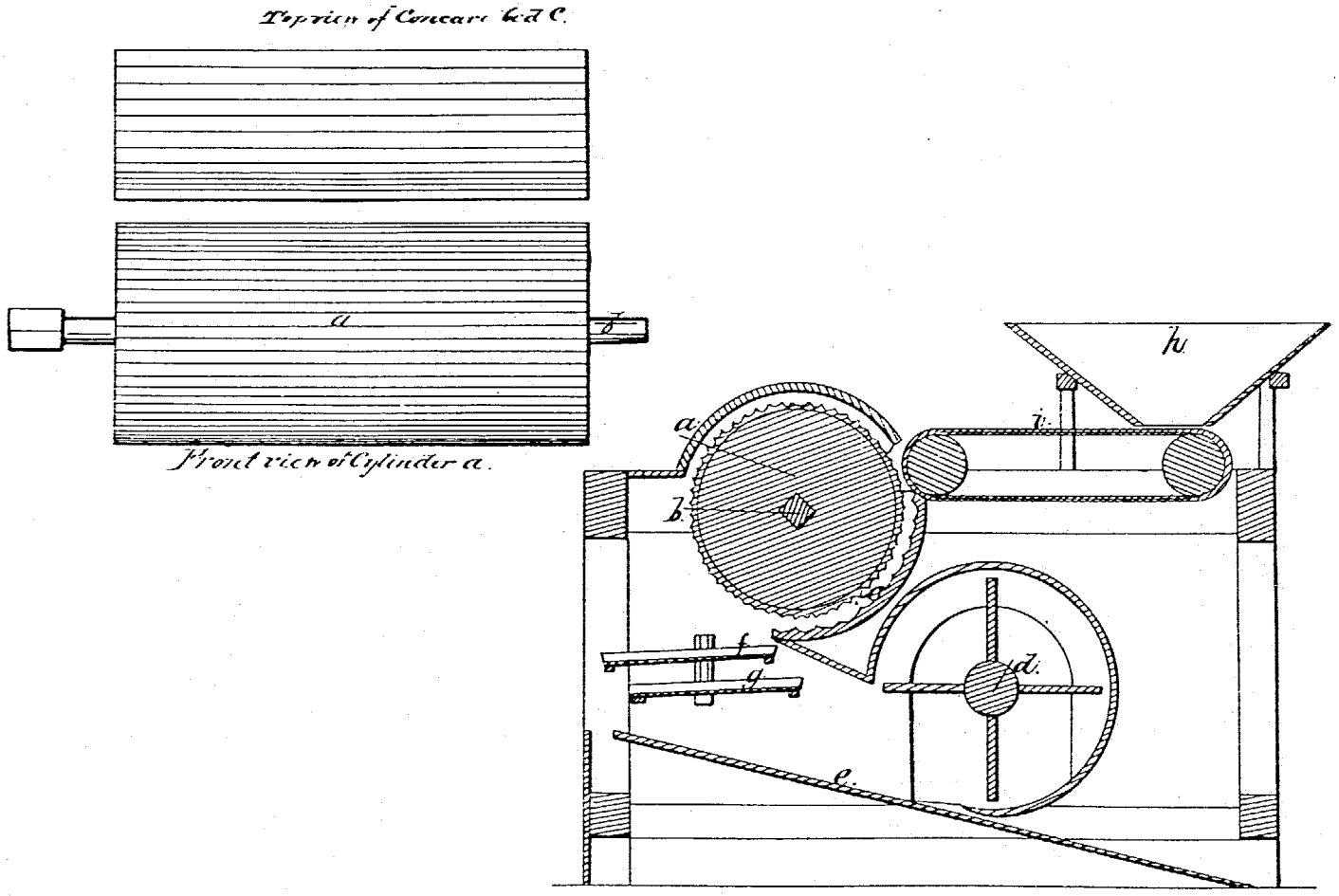
N. PETERS, PHOTO-LITHOGRAPHER, WASHINGTON, D. C.

X 0007452
Sheet 2-2 Sheets.
T. Gallogher.
Clover-Huller.
Patented Feb. 28, 1833.
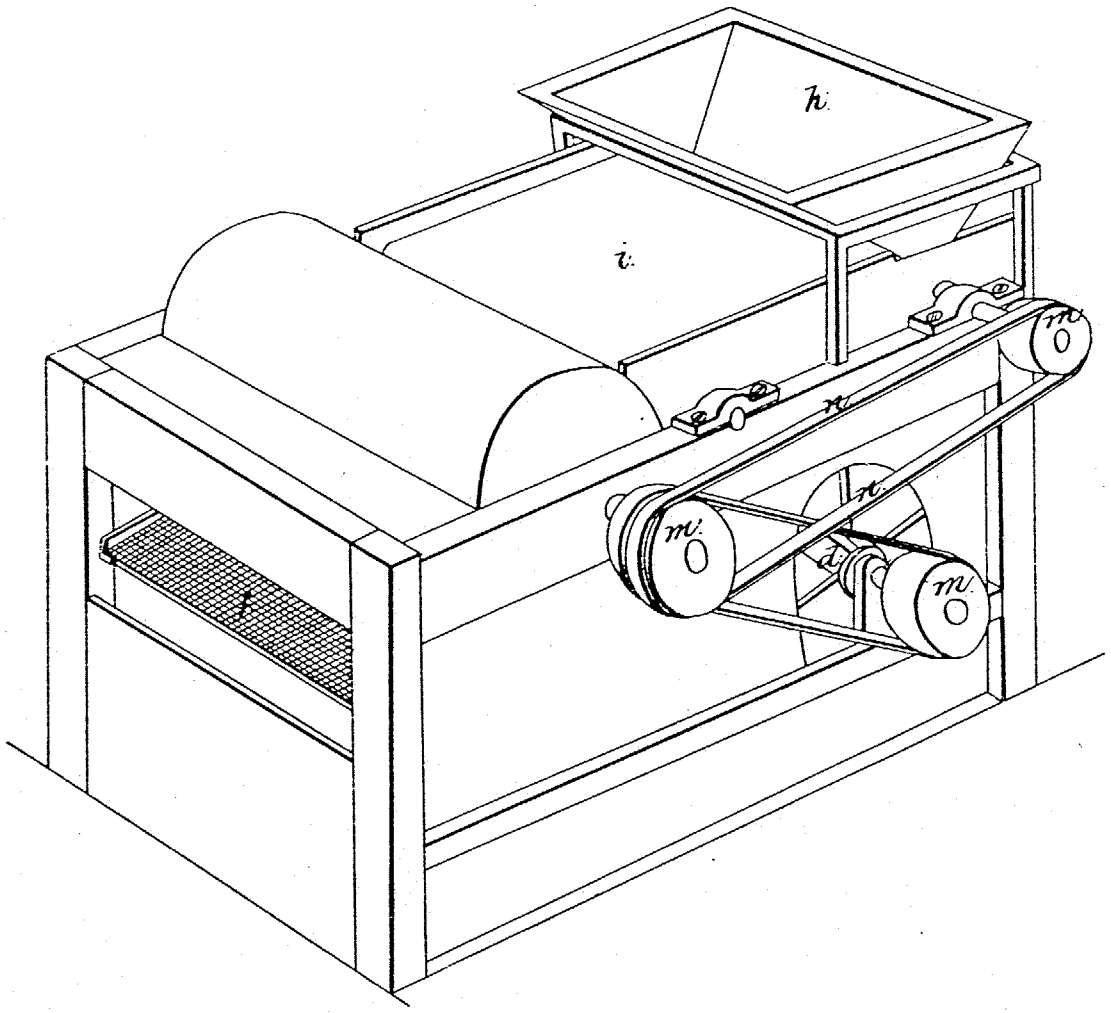
H. PETER, PHOTO-LITHOGRAPHER, WASHINGTON, D. C.

Thomas Gallagher of Fairfield County Ohio

Letters Patent.

The Schedule referred to in these Letters Patent, and making part of the same, containing a description in the words of the said Thomas Gallagher, himself of his improvement in the machine for hulling and cleaning Cloverseed.

To all to whom these these presents shall come.

Be it known that I Thomas Gallagher, of the County of Fairfield State of Ohio, have invented, a new & useful machine, for hulling & cleaning Cloverseed & that the following is a full & exact description of the construction & operation of the same, as invented by me. The machine is intended to be constructed of strong & durable wooden planks & is to be put in operation either by hand or water power, & is composed of the following component parts, (to wit); A cylinder & concave made of cast iron or wrought iron or wood; a common fan & the usual horizontal shaking works attached to it, A wind board, hopper & feeder & two wire sieves & is intended to be constructed after the design of the model & drawings herewith submitted; The cylinder may be made from twelve to eighteen inches in diameter, & from one to seven feet in length, & revolves on an iron axle of a proportionable size to be composed of cast iron plates, with gutters from ½ to ⅝ of an inch in width & ⅜ of an inch in depth. its merit consists in revolving upon the sharp triangular corners of the concave as will particularly be seen in the model & drawings; the concave to be made of the same dimensions of the cylinder & is fixed & stationary & may be composed of cast iron, wrought iron, or wood with gutters of from a quarter of an inch to one inch in width & depth, & which will present towards the cylinder, corners of a triangular shape as will be seen in the model & drawings. In the front part of the frame & below the concave & cylinder there is placed a common fan made of wood [illegible] [illegible] which [illegible] made of iron, & is intended to operate the And

[illegible] off from the seed as they are cast out from the operation of the cylinder & concave. The use of the wind board as will be seen de-lineated in the drawing, is to direct the operation of the wind upon the two wire seives. The seives are of two descriptions, a coarse & fine one, and are intended to be placed as follows; the coarse one upon the upper parts & the fine one upon the lower parts of the shaking apparatus before described, as can be particularly seen by reference to the model deposited in the Patent office. The office of the seives, is to separate the chaff from the seed, after they have been separated by the opera-tion of the cylinder & concave. At the tail end of the machine it is in-tended to have a board frame affixed, as high as the shaking apparatus the use of which will be to prevent the chaff mixing with the seed. The clover is deposited in the hopper of the machine & when in operation is forced by the feeder to the influence of the cylinder & concave. When the above Machine is worked by horse power it is operated by bands or gearing from a drum head affixed round the whirls of the feeder, cylinder, & fan, as will be seen by the model the same process is observed when the Machine is run by water power. I claim as my own invention in the above described ma-chine, its outward & internal construction, the feeder, cylinder, con-cave & wind board. I also claim to have improved the first sha-king apparatus, so as to conduce to the operation of the machine. And I claim as my own invention the result of the united operation of the whole Machine.

Given under my signature at Lancaster this [illegible] day of February AD 1828.

Witnesses
William J. Reese
J. Emlich

Thomas Gallagher

Drawings

[illegible]